United States Patent
Xu et al.

(10) Patent No.: US 12,344,746 B2
(45) Date of Patent: Jul. 1, 2025

(54) RUBBER COMPOSITION, AND TIRE USING THE SAME

(71) Applicant: HANGZHOU XINGLU TECHNOLOGIES CO., LTD., Zhejiang (CN)

(72) Inventors: Tao Xu, Zhejiang (CN); Zhi Sheng Fu, Hangzhou (CN); An Yang Wu, Hangzhou (CN)

(73) Assignees: HANGZHOU XINGLU TECHNOLOGY CO., LTD., Zhejiang (CN); ZHEJIANG UNIVERSITY, Zhejiang (CN)

( * ) Notice: Subject to any disclaimer, the term of this patent is extended or adjusted under 35 U.S.C. 154(b) by 980 days.

(21) Appl. No.: 17/259,924

(22) PCT Filed: Jun. 25, 2019

(86) PCT No.: PCT/CN2019/092648
§ 371 (c)(1),
(2) Date: Jan. 12, 2021

(87) PCT Pub. No.: WO2020/011009
PCT Pub. Date: Jan. 16, 2020

(65) Prior Publication Data
US 2021/0292519 A1    Sep. 23, 2021

(30) Foreign Application Priority Data

Jul. 13, 2018    (CN) .................. 201810769652.X

(51) Int. Cl.
*C08L 9/06*    (2006.01)
*B60C 1/00*    (2006.01)
*B60C 11/00*    (2006.01)
*C08L 7/00*    (2006.01)
*C08L 23/06*    (2006.01)

(52) U.S. Cl.
CPC .............. *C08L 9/06* (2013.01); *B60C 1/0016* (2013.01); *B60C 1/0025* (2013.01); *B60C 11/0008* (2013.01); *C08L 7/00* (2013.01); *C08L 23/06* (2013.01); *B60C 2011/0025* (2013.01); *C08L 2205/035* (2013.01)

(58) Field of Classification Search
CPC ... C08L 9/06; C08L 7/00; C08L 23/06; B60C 1/0016; B60C 1/0025; B60C 1/0008; B60C 11/0008
See application file for complete search history.

(56) References Cited

U.S. PATENT DOCUMENTS

| | | | |
|---|---|---|---|
| 6,103,658 | A | 8/2000 | Mackenzie et al. |
| 6,660,677 | B1 | 12/2003 | Mackenzie et al. |
| 2009/0115108 | A1* | 5/2009 | Rodgers .................... C08L 7/00 524/495 |

FOREIGN PATENT DOCUMENTS

| | | | | |
|---|---|---|---|---|
| CN | 1114934 | A | 1/1996 | |
| CN | 1644618 | A | 7/2005 | |
| CN | 101531725 | A | 9/2009 | |
| CN | 101812145 | A | 8/2010 | |
| CN | 102827312 | A | 12/2012 | |
| CN | 104877225 | A * | 9/2015 | ............... C08K 3/22 |
| CN | 104926962 | A | 9/2015 | |
| CN | 105199155 | A * | 12/2015 | ............... C08L 7/00 |
| CN | 107573571 | A | 1/2018 | |
| CN | 109749147 | A | 5/2019 | |
| DE | 214623 | A1 | 10/1984 | |

OTHER PUBLICATIONS

English machine translation of CN 1644618A. (Year: 2005).*
English machine translation of CN 105199155A. (Year: 2015).*
English machine translation of CN 104877225A. (Year: 2015).*
SIPO, International Search Report issued in IA No. PCT/CN2019/092648 mailed Sep. 27, 2019.

* cited by examiner

*Primary Examiner* — John E Uselding
(74) *Attorney, Agent, or Firm* — LKGlobal | Lorenz & Kopf, LLP

(57) ABSTRACT

Disclosed is a rubber composition and a tire using the same. The rubber composition comprises a rubber matrix and a compounding component. In parts by weight, every 100 parts by weight of said rubber matrix comprises 5-95 parts by weight of a branched polyethylene, 5-90 parts by weight of a highly unsaturated diene elastomer and 0-30 parts by weight of a low unsaturated diene elastomer; and said compounding component comprises a vulcanization system and a filler. The rubber composition has good aging resistance and mechanical properties, and can be applied for products such as tires, rubber hoses, rubber tapes and so on, in which the traditional, easily aging diene rubber was commonly used.

20 Claims, No Drawings

RUBBER COMPOSITION, AND TIRE USING THE SAME

CROSS REFERENCE TO RELATED APPLICATIONS

The present application is the U.S. national phase of and claims priority to International Patent Application No. PCT/CN2019/092648 filed Jun. 25, 2019, which claims the benefit of priority from China National application No. 201810769652.X, filed on Jul. 13, 2018, the entire content of which is incorporated herein by reference into the present disclosure as if fully set forth herein.

TECHNICAL FIELD

The present invention belongs to the technical field of rubber, and specifically relates to a rubber composition and a tire using the same.

RELATED ART

Diene elastomers, such as natural rubber, styrene-butadiene rubber, polybutadiene rubber, synthetic polyisoprene and so on, are used in large quantities, have wide applicability, and are widely used in the fields of tires, rubber hoses, rubber tapes, shoe materials and the like. However, since their molecular structure includes a large number of carbon-carbon double bonds, the degree of unsaturation is high, so the aging resistance is poor.

A technical solution to improve aging resistance of highly unsaturated rubber is to combined use highly saturated rubber, such as ethylene-propylene rubber or (halogenated) butyl rubber, which can effectively improve the aging resistance. However, since the mechanical strength of the ethylene-propylene rubber and the (halogenated) butyl rubber is generally lower than that of the highly unsaturated diene rubber, the combined use will affect the mechanical properties and using effects of rubber products.

SUMMARY

In view of the problems in the prior art, the present invention provides a rubber composition including a rubber matrix and a compounding component. Every 100 parts by weight of the rubber matrix includes 5-95 parts by weight of a branched polyethylene, 5-90 parts by weight of a highly unsaturated diene elastomer and 0-30 parts by weight of a low unsaturated diene elastomer. The compounding component includes a vulcanization system and a filler.

The branched polyethylene used in the present invention is a type of ethylene homopolymer having a branching degree of not lower than 50 branches/1,000 carbons, which can be referred to as Branched Polyethylene or Branched PE. The current synthesis method of the branched polyethylene is mainly to catalyze homopolymerization of ethylene by a late transition metal catalyst. The preferable late transition metal catalyst may be one of (α-diimine) nickel/palladium catalysts. The main chain-based branches of this type of branched polyethylene may have different numbers of carbon atoms, which may specifically be 1-6, or more. The (α-diimine) nickel catalyst has a significantly lower production cost than the (α-diimine) palladium catalyst, and thus, is more suitable for industrial application. Therefore, in the present invention, a highly branched polyethylene is preferably prepared by catalyzing polymerization of ethylene by the (α-diimine) nickel catalyst.

The branching degree of the branched polyethylene used in the present invention is preferably 60-130 branches/1,000 carbons, more preferably 70-120 branches/1,000 carbons, more preferably 82-112 branches/1,000 carbons, and more preferably 82-105 branches/1,000 carbons.

A weight-average molecular weight of the branched polyethylene used in the present invention is not lower than 50,000, and may be 50,000-1,000,000, or 66,000-534,000, or 66,000-518,000, or 82,000-518,000, or 158,000-436,000, or 158,000-356,000, or 225,000-436,000, or 225,000-356,000. The unit of weight average molecular weight is g/mol.

The branched polyethylene used in the present invention has a molecular weight distribution index. A molecular weight distribution index is defined as weight average molecular weight/number average molecular weight. The molecular weight distribution index may be 1.1-10, the upper limit may be 10, or 8, or 6, or 4, or 3, or 2.5, and the lower limit may be 1.1, or 1.3, or 1.5, or 1.7, or 1.9.

A Mooney viscosity ML(1+4)125° C. of the branched polyethylene used in the present invention may be 2-120 (the upper limit may be 110, or 105, or 102, or 93, or 80, or 65, or 52, and the lower limit may be 6, or 12, or 20, or 32, or 42), preferably 12-93, or 32-80.

In a further technical solution, the content of the branched polyethylene in every 100 parts by weight of the rubber matrix is 10-80 parts, or 15-80 parts, or 20-75 parts, or 30-70 parts, or 30-60 parts, or 15-50 parts, or 15-40 parts, or 20-40 parts, or 30-40 parts.

The diene elastomer used in the present invention refers to a homopolymer or copolymer of which the polymeric monomer includes a diene monomer. The two carbon-carbon double bonds of the diene monomer may be conjugated or non-conjugated.

The polymeric monomers of the highly unsaturated diene elastomer used in the present invention includes a diene polymeric monomer with a molar content not lower than 15%, preferably includes a conjugated diene polymeric monomer with a molar content not lower than 50%. Polymeric monomers of the low unsaturated diene elastomer includes a diene polymeric monomer with a molar content lower than 15%.

The highly unsaturated diene elastomer used in the present invention may be specifically selected from: (a), any homopolymer obtained by polymerization of a conjugated diene monomer having 4 to 12 carbon atoms; and (b) any copolymer obtained by copolymerization of one or more conjugated dienes and another or one or more vinyl aromatic compounds having 8 to 20 carbon atoms. The conjugated diene is preferably: 1,3-butadiene, 2-methyl-1,3-butadiene, 2,3-di(C1-C5 alkyl)-1,3-butadiene (such as 2,3-dimethyl-1,3-butadiene, 2,3-diethyl-1,3-butadiene, 2-methyl-3-ethyl-1,3-butadiene or 2-methyl-3-isopropyl-1,3-butadiene), aryl-1,3-butadiene, 1,3-pentadiene or 2,4-hexadiene. The vinyl aromatic compound is preferably: styrene, ortho-, meta- or para-methylstyrene, a mixture of "vinyl toluene", p-(tert-butyl) styrene, methoxystyrene, chlorostyrene, divinyl benzene or vinyl naphthalene.

The highly unsaturated diene elastomer used in the present invention is more preferably selected from polybutadiene (BR), synthetic polyisoprene (IR), natural rubber (NR), butadiene copolymer, isoprene copolymer, diene/styrene copolymer and a mixture of these elastomers. The copolymer is more preferably selected from butadiene/styrene copolymer (SBR), isoprene/butadiene copolymer (BIR), isoprene/styrene copolymer (SIR) or isoprene/butadiene/styrene copolymer (SBIR).

In a further technical solution, a content of the highly unsaturated diene elastomer in every 100 parts by weight of the rubber matrix is 20-80 parts, or 30-80 parts, or 30-70 parts, or 30-60 parts, or 50-70 parts, or 20-50 parts, or 30-40 parts.

The low unsaturated diene elastomer used in the present invention may be specifically selected from: (a) a terpolymer obtained by copolymerization of ethylene, a-olefin having 3 to 8 carbon atoms and non-conjugated diene monomer having 6 to 12 carbon atoms, for example, an elastomer obtained by copolymerization of ethylene, propylene and the above type of non-conjugated diene monomer (for example, especially 1,4-hexadiene, ethylidene norbornene or dicyclopentadiene); and (b) an isobutylene-isoprene copolymer (butyl rubber) and its halogenated species, especially chlorinated or brominated species of this type of copolymer.

The low unsaturated diene elastomer used in the present invention may be more specifically selected from ethylene-propylene-diene terpolymer. A propylene content in the terpolymer may be 15 wt %-95 wt %, or 15 wt %-75 wt %, or 20 wt %-75 wt %, or 20 wt %-60 wt %, or 20 wt %-45 wt %, or 40 wt %-60 wt %, or 60 wt %-95 wt %, or 70 wt %-95 wt %, or 75 wt %-95 wt %, or 80 wt %-95 wt %, or 83 wt %-94 wt %. The diene may be conjugated or non-conjugated. Preferably, the diene is conjugated. The diene may be specifically selected from 5-ethylidene-2-norbornene (ENB), 5-vinyl-2-norbornene (VNB), dicyclopentadiene (DCPD), 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene and the like, preferably at least one of ENB or VNB. When the copolymer contains both ENB and VNB diene monomers or the composition includes two copolymers respectively using ENB and VNB as the third monomer, since ENB easily reacts with sulfur and VNB generally only reacts with peroxide crosslinking agents, such a copolymer (combination) can better play the role of a co-curing agent in a peroxide-sulfur mixed crosslinking system. A diene content in the copolymer is 0.1 wt % to 20 wt %, or 0.2 wt % to 15 wt %, or 0.5 wt % to 10 wt %, or 0.5 wt % to 5 wt %, or 0.2 wt % to 10 wt %, or 0.2 wt % to 5 wt %, or 0.2 wt % to 4 wt %, or 0.2 wt % to 3.0 wt %, or 0.2 wt % to 2.5 wt %.

In a further technical solution, when the rubber composition is used for a tire tread, in order to have good performance in wet skid resistance, in the ethylene-propylene-diene terpolymer, an ethylene content is preferably 2 wt %-25 wt %, a propylene content is preferably 60 wt %-95 wt %, and a diene content is preferably 0.5 wt %-15 wt %.

In a further technical solution, when the rubber composition is used for a tire tread or sidewall, halogenated butyl rubber may also be selected as a part of the low unsaturated diene elastomer, which helps to achieve one or more purposes of improving wet skid resistance, enhancing traction, improving dynamic ozone aging resistance or improving flex resistance.

In a further technical solution, a content of the low unsaturated diene elastomer in every 100 parts by weight of the rubber matrix is 0-25 parts, or 0-20 parts, or 5-20 parts, or 10-20 parts.

In a further technical solution, in order to improve the compatibility, blendability and co-curability between the branched polyethylene (and low unsaturated diene elastomer) and the highly unsaturated diene elastomer, the branched polyethylene and/or the low unsaturated diene elastomer in the rubber matrix may be partially or completely replaced by its functionalized modified product, and the functionalized modified monomer used may be selected from maleic anhydride (MAH), methacrylic acid (MA), acrylic acid (AA), itaconic acid (IA), fumaric acid (FA), isocyanate, glycidyl methacrylate (GMA), methyl methacrylate (MMA), dibutyl fumarate (DBF), P-hydroxyethyl methacrylate (HEMA), dibutyl maleate (DBM), diethyl maleate (DEM), halogen elements (such as liquid chlorine and liquid bromine), halogen-containing compounds (such as N-bromosuccinimide, bromodimethylhydantoin, carbon-adsorbing chlorine and carbon-adsorbing bromine), sulfur-containing compounds (such as sulfur dioxide and sulfinyl chloride), vinyltrimethoxysilane (VTMS), vinyltriethoxysilane (VTES), 3-methacryloxypropyl trimethoxysilane (VMMS), styrene (St), a-methylstyrene (a-MSt), acrylonitrile (AN) and the like, or mixtures thereof. The branched polyethylene and the ethylene-propylene-diene terpolymer with high ethylene content have relatively low glass transition temperature, and grafting a certain amount of polar functional groups, such as styrene and a-methylstyrene, is beneficial to increasing their glass transition temperature, so that when the rubber composition of the present invention is applied to a tire tread, it can help to improve the wet skid resistance of the composition.

The vulcanization system used in the present invention may be selected from a peroxide vulcanization system, a sulfur vulcanization system or a radiation sensitizing vulcanization system, preferably the peroxide vulcanization system, the sulfur vulcanization system and a mixed vulcanization system thereof.

The peroxide vulcanization system includes a peroxide crosslinking agent, including at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl) benzene (BIBP), 2,5-dimethyl-2,5-bis(benzoylperoxy) hexane (DBPMH), tert-butyl peroxybenzoate and tert-butylperoxy-2-ethylhexyl carbonate.

The peroxide vulcanization system further includes a co-crosslinking agent, including at least one of triallyl cyanurate, triallyl isocyanurate (TAIC), ethylene glycol dimethacrylate, ethyl dimethacrylate, triethylenedimethacrylate, triallyl trimellitate, trimethylolpropane trimethacrylate, ethylene glycol dimethacrylate, N,N'-m-phenylene bismaleimide (HVA-2), N,N'-bisfurfurylidene acetone, 1,2-polybutadiene, p-quinone dioxime, sulfur and metal salts of unsaturated carboxylic acids. The metal salts of unsaturated carboxylic acids include at least one of zinc acrylate, zinc methacrylate (ZDMA), magnesium methacrylate, calcium methacrylate and aluminum methacrylate.

In a further technical solution, based on 100 parts by weight of the rubber matrix, an amount of the peroxide crosslinking agent is 0.1-10 parts, and an amount of the co-crosslinking agent is 0.1-20 parts.

The sulfur vulcanization system includes sulfur or a sulfur donor compound and an accelerator. The sulfur donor compound may be used in combination with sulfur or instead of sulfur. The sulfur donor compound may be selected from tetramethylthiuram disulfide, tetraethylthiuram disulfide, dipentamethylene thiuram hexasulfide, N,N'-caprolactam disulfide and the like. The accelerator may be selected from at least one of benzothiazole 2-thiol, dibenzothiazyl disulfide, tetramethylthiurammonosulfide, tetramethylthiuram disulfide, tetraethylthiuram disulfide, N-tert-butyl-2-benzothiazolylsulfenamide, N-cyclohexyl-2-benzothiazolylsulfenamide, N,N-dicyclohexyl-2-benzothiazolylsulfenamide, bismaleimide and 1,2-ethylenethiourea.

In a further technical solution, based on 100 parts by weight of the rubber matrix, an amount of the sulfur is 0.1-5 parts, or 0.2-5 parts, or 0.5-3 parts, or 0.5-1.5 parts. An amount of the accelerator is 0.1-5 parts, or 0.3-3 parts, or 0.3-2 parts, or 0.5-1 part.

The main ingredient of the radiation sensitizing vulcanization system is a radiation sensitizer, which may be selected from triallyl cyanurate, triallyl isocyanurate, ethylene glycol dimethacrylate, triethylenedimethacrylate, trimethylolpropane trimethacrylate and the like.

The filler used in the present invention refers to any material for enhancing or improving physical properties, imparting specific processing properties or reducing the cost of the rubber composition. The preferable filler includes, but not limited to, carbon black, calcium carbonate, calcined clay, mica, silica (also referred to as white carbon black), silicate, talc, titanium dioxide, montmorillonite, short fiber, kaolin, bentonite or a mixture thereof. The filler may have any size or particle size, for example, 0.0001 micron-100 microns. The preferable reinforcing filler commonly used for reinforcing rubber compositions for tires includes, for example, carbon black or silica or a blend of carbon black and silica. The silica is preferably a highly dispersible species, which is beneficial to improving its dispersion effect in the rubber matrix of the present invention and enhancing the physical properties of the rubber.

In a further technical solution, based on 100 parts by weight of the rubber matrix, an amount of the reinforcing filler is 20-200 parts, preferably 30-150 parts, more preferably 35-80 parts.

In a further technical solution, the compounding component of the rubber composition of the present invention further includes 2-80 parts of plasticizer, 0-3 parts of stearic acid, 0-10 parts of metal oxide, 0-20 parts of surface modifier, 0-8 parts of stabilizer, 0-15 parts of tackifier and 0-20 parts of adhesive.

The plasticizer includes, but not limited to, pine tar, engine oil, naphthenic oil, paraffin oil, aromatic oil, liquid 1,2-polybutadiene, liquid polyisobutylene, ethylene glycol dimethacrylate, liquid ethylene propylene rubber, coumarone, RX-80, stearic acid, paraffin, chlorinated paraffin, dioctyl adipate, dioctyl sebacate, epoxidized soybean oil, dibutyl phthalate, dioctyl phthalate, diisodecyl phthalate, bistridecyl phthalate andtrioctylmetabenzoate. The particularly preferable plasticizer is naphthenic oil, paraffin oil or a mixture thereof.

The metal oxide includes, but not limited to, zinc oxide, magnesium oxide and calcium oxide, preferably zinc oxide.

The surface modifier includes, but not limited to, polyethylene glycol, diphenyl silanediol, triethanolamine, silane coupling agents and titanate coupling agents, preferably silane coupling agents.

The stabilizer includes, but not limited to, 2,2,4-trimethyl-1,2-dihydroquinoline polymer (RD), 6-ethoxy-2,2,4-trimethyl-1,2-dihydroquinoline (AW), 2-mercaptobenzimidazole (MB), N-phenyl-N'-cyclohexyl-p-phenylenediamine (4010), N-isopropyl-N'-phenyl-p-phenylenediamine (4010NA) and N-(1,3-dimethyl)butyl-N'-phenyl-p-phenylenediamine (4020).

Since the bonding performance of the branched polyethylene or the ethylene-propylene-diene terpolymer is significantly lower than that of natural rubber or styrene-butadiene rubber, in order to improve the internal bonding performance of the product, a certain amount of adhesive and/or tackifier may be added.

The adhesive includes, but not limited to, resorcinol donor, methylene donor, organic cobalt salt, maleic anhydride butadiene resin and liquid natural rubber. The resorcinol donor may be selected from at least one of resorcinol (adhesive R), adhesive RS, adhesive RS-11, adhesive R-80, adhesive RL, adhesive PF, adhesive PE, adhesive RK and adhesive RH. The methylene donor may be selected from at least one of hexamethylenetetramine (HMTA), adhesive H-80, adhesive A, adhesive RA, adhesive AB-30, adhesive Rq, adhesive RC, adhesive CS963 and adhesive CS964. The organic cobalt salt, such as cobalt boroacylate, can effectively enhance the adhesive strength between the rubber composition and metals. In a further technical solution, the adhesive may further be selected from a triazine adhesive, of which the model may be selected from at least one of adhesive TAR, adhesive TZ, adhesive AIR-1 and adhesive AIR-101, preferably at least one of adhesive AIR-1 and adhesive AIR-101. The triazine adhesive can partially replace the above resorcinol donor adhesive, and has the advantages of good adhesion and relative environment friendliness. The adhesive system in cooperation with the silica may have good adhesion.

As for the tackifier, the pine tar, coumarone resin, RX-80 and liquid polyisobutylene in the aforementioned plasticizer also act as a tackifier. A liquid coumarone resin has a better tackifying effect than a solid coumarone resin. The tackifier may also be selected from C5 petroleum resin, C9 petroleum resin, Escorez1102 resin, hydrogenated rosin, terpene resin, alkyl phenol resin, modified alkyl phenol resin, alkyl phenol-acetylene resin, metal salts of unsaturated carboxylic acids and the like.

The present invention provides a tire. Rubber used for a tread of the tire includes the above rubber composition.

The present invention further provides a tire. Rubber used for a sidewall of the tire includes the above rubber composition.

The rubber composition of the present invention may exist in the form of an uncrosslinked rubber mixture, and may exist in the form of cured rubber after further crosslinking reaction occurs. The cured rubber may also be referred to as vulcanizate.

The rubber composition of the present invention may be mixed and cured by any conventional means known to those skilled in the art.

The rubber composition of the present invention may usually be mixed in one or more suitable mixing devices (such as a Banbury mixer, an open mill and a kneader). Firstly, all the ingredients except the vulcanization system are mixed. This mixing usually takes 3-5 minutes, but a longer or shorter mixing time may also be used. The mixing temperature may range from room temperature or below to a temperature of 150° C. or above. If the mixing temperature used is higher than the activation temperature of the vulcanization system, the rubber should be cooled to below the activation temperature after the mixing is completed, and then the vulcanization system is added through mixing. When the compounding component contains the silica and the coupling agent, the corresponding preferable mixing process includes: the rubber matrix is firstly mixed at 110° C. to 130° C. for 30 seconds to 2 minutes, then the silica, the coupling agent and other ingredients are added, the composition is further mixed at a most effective high temperature of up to 140° C. to 160° C. for 30 seconds to 3 or 4 minutes. Ideally, the silica is mixed in small amounts several times. Most preferably, half of the silica is mixed first, and then the other half is mixed.

Due to the uneven distribution of various fillers in the rubber phases of the blended rubber when the above mixing method is used, negative effects, such as uneven curing and stress concentration, will be caused, resulting in degradation of physical and mechanical properties of blended rubber vulcanizate. The first solution is to firstly add most of the filler to the low unsaturated low-polarity rubber to prepare a master batch, then add blended rubber, add the remaining small amount of filler and continue mixing according to the traditional method. The second solution is to firstly make two rubbers to be blended respectively into master batches for mixing and then mix the master batches in proportion.

The present invention provides a method for processing the above rubber composition, in which rubber mixing is performed by a master batch method: assuming that the proportion of the branched polyethylene and the low unsaturated diene elastomer in the rubber matrix is a % and the proportion of the rest rubber matrix ingredients is b %, the branched polyethylene and the low unsaturated diene elastomer are set as the rubber matrix of a master batch (A), the rest rubber ingredients are set as the rubber matrix of a master batch (B), and in the mixing stage of the master batch, the compounding component is allocated to the master batch (A) at a proportion higher than a %.

In a further technical solution, the mixing method of the above rubber composition includes the following steps:

Step one: mixing is performed in a Banbury mixer to obtain two master batches.

Step two: the master batch (A) and the master batch (B) are mixed in the Banbury mixer in proportion to obtain a final batch (C), and after the final batch (C) is plasticated on an open mill to obtain a sheet, the sheet is discharged and placed for further processing.

The rubber composition of the present invention can be used to manufacture a tire, specifically a tread, sidewall or carcass of a tire, preferably the tread or sidewall. That is, the rubber composition of the present invention added as necessary is extruded according to the shape of the tread, sidewall or carcass of the tire in the uncured step, and is molded together with other tire components in a tire molding machine by a typical method to form an uncured tire. The uncured tire is heated and pressurized in a curing press to obtain the tire.

The beneficial effect of the present invention is to provide a novel rubber composition with good aging resistance and good mechanical properties, which can replace the easily aging diene rubber commonly used in tires, rubber hoses, and rubber tapes. More specifically, when applied to the tire tread, the rubber composition can also enhance compression set resistance, reduce rolling resistance and reduce fuel consumption, and thus, is energy-saving and environment-friendly.

DETAILED DESCRIPTION

The following provides descriptions of the present invention, but is not intended to limit the scope of the present invention. Some non-essential improvements and adjustments made to the present invention by a person of ordinary skill in the art according to the summary still fall within the protection scope of the present invention.

The branched polyethylene used in the embodiments can be obtained by catalyzing homopolymerization of ethylene by a ($\alpha$-diimine) nickel catalyst under the action of a cocatalyst. The structure and synthesis method of the ($\alpha$-diimine) nickel catalyst used and the method for preparing branched polyethylene with the ($\alpha$-diimine) nickel catalyst are disclosed prior art. The documents used may include, but not limited to, CN102827312A, CN101812145A, CN101531725A, CN104926962A, U.S. Pat. Nos. 6,103,658, and 6,660,677.

The branched polyethylene raw materials used in the embodiments have the following characteristics: the branching degree is preferably 50-130 branches/1,000 carbons, a weight average molecular weight is preferably $6.6 \times 10^4$-$53.4 \times 10^4$ g/mol, and a Mooney viscosity ML(1+4)125° C. is preferably 6-105. The branching degree is more preferably 82-112 branches/1,000 carbons, the weight average molecular weight is preferably $20 \times 10^4$-$40 \times 10^4$ g/mol, and the Mooney viscosity ML(1+4)125° C. is preferably 20-80. The branching degree is measured by hydrogen NMR spectroscopy, and the mole percentages of various branches are measured by carbon NMR spectroscopy.

The branched polyethylene raw materials used in the embodiments may be further selected from the following table:

| Branched polyethylene number | Branching degree | Methyl content/% | Ethyl content/% | Propyl content/% | Butyl content/% | Amyl content/% | Hexyl and longer branch content/% | Weight average molecular weight/ten thousand | Molecular weight distribution | Mooney viscosity ML(1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 120 | 49.2 | 17.9 | 8.2 | 6.1 | 5.1 | 13.5 | 8.2 | 2.1 | 12 |
| PER-3 | 112 | 52.4 | 16.2 | 7.6 | 5.6 | 4.9 | 13.3 | 22.5 | 1.9 | 32 |
| PER-4 | 105 | 54.0 | 13.7 | 6.4 | 5.3 | 5.1 | 15.5 | 26.8 | 2.1 | 42 |
| PER-5 | 102 | 56.2 | 12.9 | 6.2 | 5.2 | 4.9 | 14.6 | 27.9 | 2.1 | 52 |
| PER-6 | 99 | 59.6 | 11.6 | 5.8 | 4.9 | 5.1 | 13.0 | 28.3 | 1.8 | 63 |
| PER-7 | 97 | 60.5 | 10.8 | 5.7 | 4.7 | 4.9 | 13.3 | 34.8 | 2.0 | 65 |
| PER-8 | 90 | 62.1 | 9.4 | 5.4 | 4.6 | 4.5 | 14.0 | 32.1 | 2.1 | 77 |
| PER-9 | 82 | 64.2 | 8.7 | 5.3 | 4.2 | 3.9 | 13.7 | 35.6 | 1.7 | 80 |
| PER-10 | 72 | 67.1 | 6.2 | 3.7 | 4.1 | 3.3 | 15.6 | 15.8 | 1.9 | 20 |
| PER-11 | 70 | 66.5 | 7.2 | 4.6 | 3.2 | 3.2 | 15.3 | 43.6 | 2.1 | 93 |
| PER-12 | 60 | 68.1 | 7.1 | 4.2 | 2.7 | 2.8 | 15.1 | 51.8 | 2.2 | 102 |
| PER-13 | 50 | 69.2 | 7.1 | 3.9 | 2.5 | 2.6 | 14.7 | 53.4 | 2.3 | 105 |

In a specific embodiment, the highly unsaturated diene elastomer may be selected from polybutadiene (BR), synthetic polyisoprene (IR), natural rubber (NR), butadiene/styrene copolymer (SBR), isoprene/butadiene copolymer (BIR), isoprene/styrene copolymer (SIR), isoprene/butadiene/styrene copolymer (SBIR) or mixtures thereof.

In a preferred embodiment, the highly unsaturated diene elastomer mainly includes SBR. The SBR may be emulsion polymerized styrene-butadiene rubber (ESBR) or solution polymerized styrene-butadiene rubber (SSBR), which has an appropriate styrene content, for example, 20 wt %-35 wt %, or a high styrene content, for example, 35 wt %-45 wt %. The high styrene content is beneficial to improving wet skid resistance of the rubber composition. In the butadiene part, a 1,2 structure content is 10%-65%, a trans-1,4 structure content is 15%-75%, and Tg is between −65° C. and −10° C.

In another embodiment, the highly unsaturated diene elastomer is a composition of different diene elastomers, for example, SBR/BR, or SBR/NR, or SBR/IR, or SBR/BR/NR, or SBR/BR/IR, or NR/BR, or IR/BR. The polybutadiene is preferably a species with a cis-1,4 structure content (mol %) of greater than 80%. The synthetic polyisoprene elastomer is preferably a species with a cis-1,4 structure content (mol %) of greater than 90%, and more preferably a species with a cis-1,4 structure content (mol %) of greater than 98%.

In another aspect, the highly unsaturated diene elastomer composition in the embodiment preferably includes both an elastomer having a high glass transition temperature (Tg is not lower than −70° C.) and an elastomer having a low glass transition temperature (Tg is −110° C.--−80° C., preferably −100° C.--−90° C.). The elastomer having a high glass transition temperature may be selected from SSBR, ESBR, NR, high-cis-1,4-content IR, BIR, SIR, SBIR, and a mixture of these elastomers. The elastomer having a low glass transition temperature is preferably BR with a high cis-1,4 structure content.

In another embodiment, the highly unsaturated diene elastomer composition includes both SSBR or ESBR having a high glass transition temperature and high cis BR having a low glass transition temperature.

The styrene-butadiene rubber used in the embodiments of the present invention may be selected from the following table:

| Designation of styrene-butadiene rubber | Bound styrene content/% | Mooney viscosity ML(1 + 4)100° C. | Type of anti-aging agent |
|---|---|---|---|
| SBR1502 | 23.5 | 52 | Non-polluting type |
| SBR1516 | 40 | 50 | Non-polluting type |

The designation of the natural rubber used in the embodiments of the present invention is 3L, Vietnam.

The polybutadiene rubber used in the embodiments of the present invention is BR9000.

In a specific embodiment, the low unsaturated diene elastomer is preferably an ethylene-propylene-diene terpolymer. The diene is ENB or VNB. The propylene content is 20 wt %-60 wt %, or 60 wt %-95%.

The ethylene-propylene-diene terpolymer used in the embodiments may be specifically selected from the following table:
Low-Propylene-Content Copolymers:

| EPDM number | Ethylene content/% | Propylene content/% | ENB content/% | Mooney viscosity |
|---|---|---|---|---|
| EPDM-1 | 70 | 25.5 | 4.5 | ML(1 + 4)125° C.: 55 |
| EPDM-2 | 50 | 42 | 8 | ML(1 + 4)125° C.: 30 |
| EPDM-3 | 50 | 41 | 9 | ML(1 + 4)125° C.: 65 |
| EPDM-4 | 55 | 33.5 | 11.5 | ML(1 + 8)100° C.: 55 |

High-Propylene-Content Copolymers:

| PEDM number | Ethylene content/% | Propylene content/% | ENB content/% | MFR(230° C., 2.16 kg) |
|---|---|---|---|---|
| PEDM-1 | 11 | 84.7 | 4.3 | 4.2 |
| PEDM-2 | 4.5 | 91.4 | 4.1 | 2.6 |

In another embodiment, the low unsaturated diene elastomer may further includes halogenated butyl rubber, which may be specifically selected from the following table:

| Halogenated butyl rubber number | Mass percentage of bromine/% | Mooney viscosityML(1 + 8)125° C. |
|---|---|---|
| BIIR-1 | 2 | 32 |
| BIIR-2 | 2.1 | 37 |
| BIIR-3 | 2.1 | 46 |

In a specific embodiment, the reinforcing filler is carbon black and/or silica. The carbon black may be preferably selected from SAF, ISAF or HAF type carbon black, more specifically, such as N115, N134, N220, N234, N326, N330, N339, N347 and N375, or higher series of carbon black, such as N550, N660 and N772. The carbon black may also be added in the form of a rubber master batch. The silica is preferably a highly dispersible species, for example, Zeosil1165MP or Zeosil1115MP from Rhodia, Ultrasil7000 or Ultrasil7005 from Degussa, and the like.

In a specific embodiment, when the reinforcing filler contains silica, it is preferable to add a silane coupling agent to assist its reinforcing effect. The silane coupling agent may be selected from sulfur-containing coupling agents, vinyl coupling agents, mercapto coupling agents, amino coupling agents, nitro coupling agents, chlorine-containing coupling agents or epoxy propoxy coupling agents commonly used by those skilled in the art, and more specifically, may be selected from vinyltriethoxysilane (A-151), vinyltrimethoxysilane (A-171), vinyl tris(2-methoxyethoxy) silane (A-172), γ-glycidoxypropyldimethoxysilane (A-187), γ-mercaptopropyl dimethoxysilane (A-189), bis(3-ethoxysilylpropyl) tetrasulfide (Si69), bis(3-ethoxysilylpropyl) disulfide (TESPD), γ-aminopropyltriethoxysilane (KH-550) and the like. The sulfur-containing and mercapto-containing coupling agents are more suitable for a sulfur vulcanization system, and the vinyl coupling agents are more suitable for a peroxide vulcanization system.

In a specific embodiment, the vulcanization system may be selected from a peroxide vulcanization system, a sulfur vulcanization system or a peroxide-sulfur mixed vulcanization system. Optional peroxide crosslinking agents, co-crosslinking agents, sulfur donors and curing accelerators are all species known to those skilled in the art.

In another embodiment, the compounding component of the rubber composition may further include a plasticizer, zinc oxide, a processing aid, a stabilizer (anti-aging agent) and a tackifier, all of which are known to those skilled in the art.

In a specific embodiment process, the rubber composition of the present invention may be mixed and cured by any conventional means known to those skilled in the art.

The rubber composition of the present invention may usually be mixed in one or more suitable mixing devices (such as a Banbury mixer, an open mill and a kneader). Firstly, all the ingredients except the vulcanization system are mixed. This mixing usually takes 3-5 minutes, but a longer or shorter mixing time may also be used. The mixing temperature may range from room temperature or below to a temperature of 150° C. or above. If the mixing temperature used is higher than the activation temperature of the vulcanization system, the rubber should be cooled to below the activation temperature after the mixing is completed, and then the vulcanization system is added through mixing.

The mixed composition may be formed into a cured tread or sidewall by a suitable extrusion process, and molded together with other tire components in a tire molding machine by a typical method to form an uncured tire. The uncured tire is heated and pressurized in a curing press to obtain the tire.

Rubber performance test methods involved in the embodiments:

1. Hardness test: The test is performed with a hardness tester in accordance with the national standard GB/T531.1-2008, and the test temperature is room temperature.
2. Tensile strength and elongation at break performance test: The test is performed with an electronic tensile testing machine in accordance with the national standard GB/T528-2009, the tensile speed is 500 mm/min, the test temperature is 23±2° C., and the sample is a type 2 dumbbell sample.
3. Mooney viscosity test: The test is performed with a Mooney viscometer in accordance with the national standard GB/T1232.1-2000.
4. Hot air accelerated aging test: The test is performed in a thermal aging test box in accordance with the national standard GB/T3512-2001.
5. Compression set test: The test is performed with a compression set device in accordance with the national standard GBAT7759-1996, a type B sample is used, the amount of compression is 25%, and the test temperature is 70° C.
6. Ozone aging resistance test: In accordance with the national standard GBAT7762-2003, an ozone cracking resistance test is carried out in the ozone aging chamber, under a certain static tensile strain condition, with an exposure to the air with a certain ozone concentration, and in an environment with a specified temperature (40° C.) and no direct influence of light.
7. Curing curve test: The test is performed in a rotorless curemeter in accordance with the national standard GB/T16584-1996.
8. Dynamic mechanical property test: DMA-242 dynamic mechanical analyzer produced by NETZSCH (German) is used to analyze the dynamic mechanical properties of the cured rubber. The test conditions are as follows: a double cantilever beam mode is used, the frequency is 10 Hz, the tensile displacement is 7%, the test temperature ranges from −100° C.-100° C., and the heating rate is 3K/min.
9. Tear strength test: The test is performed with an electronic tensile testing machine in accordance with the national standard GB/T529-2008, the tensile speed is 500 mm/min, the test temperature is 23=2° C., and the sample is a right-angled sample.

The present invention will be further described below with the embodiments:

Embodiments 1-6 and Comparative Example 1

The present invention provides a rubber composition with good physical and mechanical properties and good aging resistance, which is suitable for preparing cycle tire tread rubber. Embodiments 1-5 are taken as examples for specific formulations.

The basic formulations of Embodiments 1-5 and Comparative Example 1 are shown in Table 1: (in which the parts by weight of each ingredient relative to every 100 parts by weight of the rubber matrix are listed)

TABLE 1

| Ingredient | Embodiment 1 | Embodiment 2 | Embodiment 3 | Embodiment 4 | Embodiment 5 | Embodiment 6 | Comparative Example 1 |
|---|---|---|---|---|---|---|---|
| Styrene-butadiene rubber 1502 | 70 | 70 | 40 | 30 | 30 | | 70 |
| EPDM-2 | 25 | | | | | | 30 |
| Branched polyethylene | 5 | 30 | 30 | 50 | 70 | 95 | |
| Branched polyethylene number | PER-9 | PER-8 | PER-8 | PER-8 | PER-8 | PER-6 | |
| Natural rubber | | | 30 | 20 | | 5 | |
| Zinc oxide | 5 | 5 | 5 | 5 | 5 | 5 | 5 |
| Stearic acid | 2 | 2 | 2 | 2 | 2 | 1 | 2 |
| Silane coupling agent A-172 | | | | 2 | | | |
| Calcium carbonate | | | | | 40 | 35 | |
| Titanate coupling agent | | | | | | 1 | |
| Calcined clay | 50 | 50 | 50 | | | | 50 |
| White carbon black | | | | 20 | | | |
| Carbon black N330 | 60 | 60 | 60 | | 35 | 50 | 60 |
| Paraffin oil Sunpar2280 | 20 | 20 | 20 | 10 | 10 | 10 | 20 |
| 1102 resin | 3 | 3 | 3 | 3 | 3 | | 3 |
| BIPB | 1 | 1 | 1 | 1 | 3 | 3 | 1 |
| Sulfur | 2 | 2 | 2 | 2 | 1 | 0.5 | 2 |
| TAIC | 0.3 | 0.3 | 0.3 | 0.3 | 0.6 | 1 | 0.3 |
| Accelerator CZ/TMTD | 1/0.5 | 1/0.5 | 1/0.5 | 1/0.5 | 1/0.5 | 0.75/0 | 1/0.5 |
| ZDMA | | | | 2 | 2 | 2 | |

The formulations of Embodiments 1-6 and Comparative Example 1 were processed according to the following method: 50% of reinforcing filler (and coupling agent), 50% of zinc oxide and stearic acid, all of BIPB and TAIC, and 50% of sulfur and accelerator were firstly mixed with EPDM and branched polyethylene to obtain a master batch, the rest rubber matrix ingredients (in which natural rubber was plasticized previously) were mixed with the aforementioned master batch for 1 minute, then the remaining ingredients were added in a conventional sequence, and the mixture was mixed for 2 minutes and discharged. After the rubber mixture was plasticated on an open mill to obtain a sheet with a roll temperature of 60° C., the roll spacing was enlarged to 2 mm, and the sheet was discharged and placed for 20 hours. After curing and placing for 16 hours, the product was subjected to various tests.

Test results of Embodiments 1-6 and Comparative Example 1 are shown in Table 2:

ethylene-propylene rubber is replaced by the branched polyethylene, the tear strength can be significantly improved, which can also be understood as weakening the influence of adding ethylene-propylene rubber on the original tear strength of the styrene-butadiene rubber. This effect means that more branched polyethylene can be used in the rubber to enhance the aging resistance of the rubber without significantly affecting the physical and mechanical properties of the rubber, which can also be confirmed from the performance in Embodiment 5. The formulations of Embodiments 1-6 can be used to prepare cycle tire tread rubber with good aging resistance.

Embodiments 7-13 and Comparative Example 2

The present invention provides a novel rubber composition for automobile tire tread rubber, which has ideal physi-

TABLE 2

| Performance test | Embodiment1 | Embodiment2 | Embodiment3 | Embodiment4 | Embodiment5 | Embodiment6 | Comparative Example 1 |
|---|---|---|---|---|---|---|---|
| Hardness (Shore A) | 63 | 64 | 63 | 60 | 62 | 62 | 63 |
| Tensile strength/MPa | 17.5 | 18.2 | 19.2 | 18.7 | 17.2 | 22.5 | 17.3 |
| Elongation at break/% | 503 | 475 | 563 | 521 | 488 | 588 | 509 |
| Tear strength/(kN/m) | 37.8 | 41.6 | 43.8 | 40.5 | 42.6 | 47.1 | 36.6 |
| Tensile stress at 300% elongation/MPa | 6.5 | 6.8 | 5.4 | 5.9 | 6.3 | 8.3 | 6.4 |
| Ozone resistance (40° C. × 0.5 μL/L × 20% elongation × 300 h, static) | No cracking | No cracking | No cracking | No cracking | No cracking | No cracking | No cracking |

Analysis of test results: By comparing Embodiment 1 with Comparative Example 1, it can be found that by replacing part of ethylene-propylene rubber with a small amount of high-molecular-weight branched polyethylene, the overall physical and mechanical properties can be improved without affecting the original effect of improving aging resistance. By comparing Embodiment 2 with Comparative Example 1, it can be found that when all the cal and mechanical properties and matches the required wet skid resistance and low rolling resistance, taking Embodiments 7-13 as examples.

The basic formulations of Embodiments 7-13 and Comparative Example 2 are shown in Table 3: (in which the parts by weight of each ingredient relative to every 100 parts by weight of the rubber matrix are listed)

TABLE 3

| Ingredient | Comparative Example 2 | Embodiment 7 | Embodiment 8 | Embodiment 9 | Embodiment 10 | Embodiment 11 | Embodiment 12 | Embodiment 13 |
|---|---|---|---|---|---|---|---|---|
| Styrene-butadiene rubber 1502 | 50 | 50 | 50 | 50 | | | | |
| Styrene-butadiene rubber 1516 | 20 | 20 | 20 | 20 | 50 | 40 | 40 | 30 |
| EPDM-3 | 30 | 10 | | | | | | |
| PEDM-1 | | | | 10 | 5 | 10 | 10 | |
| Branched polyethylene | | 20 | 30 | 20 | 25 | 30 | 45 | 20/50 |
| Branched polyethylene number | | PER-7 | PER-7 | PER-7 | PER-7 | PER-7 | PER-7 | PER-3/PER-7 |
| Natural rubber | | | | | | | 20 | 10 |
| Cis-polybutadiene BR9000 | | | | | 20 | | | |
| Zinc oxide | 5 | 5 | 5 | 5 | 5 | 5 | 5 | 5 |
| Stearic acid | 2 | 2 | 2 | 2 | 2 | 2 | 2 | 2 |
| Anti-aging agent RD | 2 | 2 | 2 | 2 | 2 | 2 | 2 | 2 |
| Silane coupling agent A-172 | 3 | 3 | 3 | 3 | 1 | 1 | 1 | 3 |

TABLE 3-continued

| Ingredient | Comparative Example 2 | Embodiment 7 | Embodiment 8 | Embodiment 9 | Embodiment 10 | Embodiment 11 | Embodiment 12 | Embodiment 13 |
|---|---|---|---|---|---|---|---|---|
| Silane coupling agent Si69 | 2 | 2 | 2 | 2 | 2 | 2 | 2 | 2 |
| White carbon black Zeosil1165MP | 50 | 50 | 50 | 50 | 30 | 30 | 30 | 50 |
| Carbon black N220 | 20 | 20 | 20 | 20 | 40 | 40 | 40 | 20 |
| Naphthenic oil | 18 | 18 | 18 | 18 | 18 | 18 | 18 | 18 |
| DCP | 1.2 | 1.2 | 1.2 | 1.2 | 1.4 | 1.5 | 1.8 | 1.8 |
| Sulfur | 1.2 | 1.2 | 1.2 | 1.2 | 1 | 0.8 | 0.8 | 0.7 |
| TAIC | 0.6 | 0.6 | 0.6 | 0.6 | 0.7 | 0.7 | 0.8 | 0.8 |
| Accelerator CZ | 1.5 | 1.5 | 1.5 | 1.5 | 1.2 | 1 | 1 | 1 |

The formulations of Embodiments 7-13 and Comparative Example 2 were processed according to the following method: 50% of reinforcing filler and coupling agent, 50% of zinc oxide and stearic acid, all of BIPB and TAIC, and 30% of sulfur and accelerator were firstly mixed with branched polyethylene and EPDM or PEDM to obtain a master batch, the rest rubber matrix ingredients (in which natural rubber was plasticized previously) were mixed with the aforementioned master batch for 1 minute, then the remaining ingredients were added in a conventional sequence, and the mixture was mixed for 2 minutes and discharged. After the rubber mixture was plasticated on an open mill to obtain a sheet with a roll temperature of 60° C., the roll spacing was enlarged to 2 mm, and the sheet was discharged and placed for 20 hours. After curing and placing for 16 hours, the product was subjected to various tests.

Test results of Embodiments 7-13 and Comparative Example 2 are shown in Table 4:

Analysis of test data: Embodiments 7-13 show that the introduction of styrene-butadiene rubber with high styrene content effectively improves the wet skid resistance of the rubber, and the presence of the branched polyethylene, EPDM or PEDM can effectively reduce the rolling resistance of the rubber. On the other hand, the comparison of Embodiments 8 and 9 shows that the introduction of an appropriate amount of PEDM with high propylene content can effectively improve the wet skid resistance, and can also improve the co-curability between the branched polyethylene and the highly unsaturated diene elastomer, and the overall product has a high elongation at break. The comparison of Embodiment 8 and Comparative Example 2 shows that when the EPDM is replaced with the branched polyethylene, the overall product can have better physical and mechanical properties and significantly higher tear strength, and can better satisfy the use requirements of tread rubber.

TABLE 4

| Performance test | Comparative Example 2 | Embodiment7 | Embodiment8 | Embodiment9 | Embodiment10 | Embodiment11 | Embodiment12 | Embodiment13 |
|---|---|---|---|---|---|---|---|---|
| Hardness (Shore A) | 63 | 63 | 63 | 62 | 62 | 62 | 63 | 64 |
| Tensile strength/Mpa | 16.7 | 19.2 | 21.1 | 19.1 | 20.5 | 22.5 | 20.3 | 22.8 |
| Elongation at break % | 478 | 486 | 456 | 502 | 483 | 518 | 471 | 510 |
| Tear strength/(kN/m) | 39.2 | 46.6 | 47.3 | 48.4 | 43.5 | 50.6 | 48.1 | 53.8 |
| Tensile stress at 300% elongation/Mpa | 11.7 | 12.9 | 13.8 | 12.5 | 13.1 | 14.3 | 12.1 | 14.2 |
| 0° C.Tanδ | 0.42 | 0.43 | 0.42 | 0.46 | 0.48 | 0.44 | 0.43 | 0.39 |
| 60° C.Tanδ | 0.15 | 0.14 | 0.13 | 0.13 | 0.13 | 0.12 | 0.11 | 0.1 |

Embodiments 14-16 and Comparative Example 3

The basic formulations of Embodiments 14-16 and Comparative Example 3 are shown in Table 5:10 (in which the parts by weight of each ingredient relative to every 100 parts by weight of the rubber matrix are listed)

TABLE 5

| Ingredient | Embodiment 14 | Embodiment 15 | Embodiment 16 | Comparative Example 3 |
|---|---|---|---|---|
| Natural rubber | 50 | 50 | 40 | 50 |
| EPDM-4 | | 10 | | 30 |
| Branched polyethylene | 30 | 20 | 20 | |
| Branched polyethylene number | PER-6 | PER-6 | PER-7 | |
| Halogenated butyl rubber BIIR-2 | | | 20 | |
| Cis-polybutadiene | 20 | 20 | 20 | 20 |

TABLE 5-continued

| Ingredient | Embodiment 14 | Embodiment 15 | Embodiment 16 | Comparative Example 3 |
|---|---|---|---|---|
| Zinc oxide | 3 | 3 | 3 | 3 |
| Stearic acid | 1 | 1 | 1 | 2 |
| Anti-aging agent MB | 1 | 1 | 1 | 1 |
| Carbon black N330 | 50 | 50 | 50 | 50 |
| Paraffin oil | 10 | 10 | 10 | |
| Naphthenic oil | 10 | 10 | 10 | 20 |
| Escorez 1102 resin | | | 5 | |
| DCP | 0.8 | 0.8 | 0.6 | |
| Sulfur | 0.5 | 0.5 | 0.5 | 1.75 |
| TAIC | 0.3 | 0.3 | 0.3 | |
| HVA-2 | | | 1 | |
| Accelerator CZ | 0.75 | 0.75 | 0.75 | 1 |

The formulations of Embodiments 14-16 and Comparative Example 3 were processed according to the following method: 50% of carbon black, 50% of zinc oxide and stearic acid, all of DCP, TAIC and HVA-2, and 30% of sulfur and accelerator were firstly mixed with branched polyethylene, EPDM and BHR to obtain a master batch, the rest rubber matrix ingredients (in which natural rubber was plasticized previously) were mixed with the aforementioned master batch for 1 minute, then the remaining ingredients were added in a conventional sequence, and the mixture was mixed for 2 minutes and discharged. After the rubber mixture was plasticated on an open mill to obtain a sheet with a roll temperature of 60° C., the roll spacing was enlarged to 2 mm, and the sheet was discharged and placed for 20 hours. After curing and placing for 16 hours, the product was subjected to various tests.

Test results of Embodiments 14-16 and Comparative Example 3 are shown in Table 6:

TABLE 6

| Test item | Embodiment 14 | Embodiment 15 | Embodiment 16 | Comparative Example 3 |
|---|---|---|---|---|
| Hardness (Shore A) | 55 | 56 | 54 | 58 |
| Tensile strength/Mpa | 19.1 | 18.2 | 16.3 | 15.2 |
| Elongation at break/% | 502 | 532 | 541 | 519 |
| Tear strength | 52.2 | 48.2 | 43.5 | 41.1 |
| Tensile stress at 300% elongation/MPa | 8.7 | 7.3 | 7.1 | 7.5 |
| Ozone resistance (40° C. × 0.5 µL/L × 20% elongation × 300 h, static) | No cracking | No cracking | No cracking | No cracking |
| Compression set (70° C. × 22 h) | 22 | 19 | 24 | 31 |
| After hot air aging (100° C. × 70 h) | | | | |
| Hardness (Shore A) | 53 | 53 | 52 | 62 |
| Tensile strength retention/% | 81 | 75 | 72 | 62 |
| Elongation at break retention/% | 88 | 89 | 80 | 47 |

In Embodiments 14-16, the introduction of branched polyethylene with narrow molecular weight distribution and high molecular weight can impart better aging resistance, physical and mechanical properties, and compression set resistance to the sidewall rubber. The sidewall mentioned above may be the sidewall of a cycle tire or the sidewall of an automobile tire.

Although the preferred embodiments of the present invention are described in this specification, these embodiments are provided only as examples. It should be understood that variants of the embodiments of the present invention described in this specification may also be used for implementing the present invention. A person of ordinary skill in the art should understand that various variants, changes and replacements may be implemented without departing from the scope of the present invention. It should be understood that the protection scope of each aspect of the present invention is determined by the claims, and a method and a structure in the claims and an equivalent method and structure thereof both fall within the scope of the claims.

What is claimed is:

1. A rubber composition, comprising:
   a rubber matrix comprising:
      a branched polyethylene, wherein the branched polyethylene is an ethylene homopolymer having a branching degree of from 50 branches/1,000 carbons to 102 branches/1,000 carbons, and a Mooney viscosity ML(1+4) at 125° C. which is between 32 and 80;
      a first unsaturated diene elastomer including a diene polymeric monomer with a molar content not lower than 15%; and
      a second unsaturated diene elastomer including a diene polymeric monomer with a molar content lower than 15%; wherein, every 100 parts by weight of said rubber matrix comprises:
      5-95 parts by weight of the branched polyethylene,
      5-90 parts by weight of the first unsaturated diene elastomer, and
      no more than 30 parts by weight of the second unsaturated diene elastomer; and
   a compounding component, wherein the compounding component comprises a vulcanization system and a filler.

2. The rubber composition according to claim 1, wherein, said branched polyethylene is an ethylene homopolymer having a branching degree of from 50 branches/1,000 carbons to 99 branches/1,000 carbons.

3. The rubber composition according to claim 2, wherein, said branched polyethylene is an ethylene homopolymer having a branching degree of from 50 branches/1,000 carbons to 97 branches/1,000 carbons.

4. The rubber composition according to claim 2, wherein, said branched polyethylene is an ethylene homopolymer having a branching degree of from 50 branches/1,000 carbons to 90 branches/1,000 carbons.

5. The rubber composition according to claim 1, wherein:
the branched polyethylene is an ethylene homopolymer having a branching degree of from 50 branches/1,000 carbons to 90 branches/1,000 carbons;
the first unsaturated diene elastomer is selected from at least one of natural rubber (NR), butadiene/styrene copolymer (SBR), polybutadiene (BR), synthetic polyisoprene (IR), isoprene/butadiene copolymer (BIR), isoprene/styrene copolymer (SIR) or isoprene/butadiene/styrene copolymer (SBIR);
the second unsaturated diene elastomer is an ethylene-propylene-diene terpolymer, in which the content of ethylene is 2 wt %-40 wt %, the content of propylene is 60 wt %-95 wt %, and the content of diene is 0.5 wt %-12 wt %;
the diene is 5-ethylidene-2-norbornene;
in every 100 parts of said rubber matrix, the content of all the ethylene-propylene-diene terpolymers is 5-30 parts;
the vulcanization system is a peroxide vulcanization system or a peroxide-sulfur mixed vulcanization system;
the filler is selected from silica, carbon black, or a blend of silica and carbon black; and
the compounding component comprises 2-80 parts of a plasticizer, 0-3 parts of a stearic acid, 0-10 parts of a metal oxide, 0-20 parts of a surface modifier, 0-8 parts of a stabilizer, 0-15 parts of a tackifier and 0-20 parts of an adhesive.

6. The rubber composition according to claim 1, wherein, the polymeric monomers of the first unsaturated diene elastomer includes diene polymeric monomers with a molar content not lower than 50%.

7. The rubber composition according to claim 1, wherein, the first unsaturated diene elastomer is selected from at least one of natural rubber (NR), butadiene/styrene copolymer (SBR), polybutadiene (BR), synthetic polyisoprene (IR), isoprene/butadiene copolymer (BIR), isoprene/styrene copolymer (SIR) or isoprene/butadiene/styrene copolymer (SBIR).

8. The rubber composition according to claim 1, wherein:
the branched polyethylene is an ethylene homopolymer having a branching degree of from 50 branches/1,000 carbons to 90 branches/1,000 carbons;
the first unsaturated diene elastomer is selected from at least one of natural rubber (NR), butadiene/styrene copolymer (SBR), polybutadiene (BR), synthetic polyisoprene (IR), isoprene/butadiene copolymer (BIR), isoprene/styrene copolymer (SIR) or isoprene/butadiene/styrene copolymer (SBIR);
the second unsaturated diene elastomer is an ethylene-propylene-diene terpolymer, in which the content of ethylene is 2 wt %-40 wt %, the content of propylene is 60 wt %-95 wt %, and the content of diene is 0.5 wt %-12 wt %;
the diene is vinyl norbornene;
in every 100 parts of said rubber matrix, the content of all the ethylene-propylene-diene terpolymers is 5-30 parts;
the vulcanization system is a peroxide vulcanization system or a peroxide-sulfur mixed vulcanization system;
the filler is selected from silica, carbon black, or a blend of silica and carbon black; and
the compounding component comprises 2-80 parts of a plasticizer, 0-3 parts of a stearic acid, 0-10 parts of a metal oxide, 0-20 parts of a surface modifier, 0-8 parts of a stabilizer, 0-15 parts of a tackifier and 0-20 parts of an adhesive.

9. The rubber composition according to claim 1, wherein, the second unsaturated diene elastomer is selected from at least one of ethylene-propylene-diene terpolymer and halogenated butyl rubber.

10. The rubber composition according to claim 9, wherein, the second unsaturated diene elastomer is composed of one or more ethylene-propylene-diene terpolymers, in which the content of propylene is 15%-95%; and in every 100 parts of said rubber matrix, the content of all the ethylene-propylene-diene terpolymers is 5-30 parts.

11. The rubber composition according to claim 9, wherein, the second unsaturated diene elastomer is an ethylene-propylene-diene terpolymer, in which the content of ethylene is 2 wt %-40 wt %, the content of propylene is 60 wt %-95 wt %, and the content of diene is 0.5 wt %-12 wt %.

12. The rubber composition according to claim 9, wherein, the second unsaturated diene elastomer is an ethylene-propylene-diene terpolymer, in which the diene is selected from at least one of 5-ethylidene-2-norbornene and vinyl norbornene.

13. The rubber composition according to claim 1, wherein, said vulcanization system is a peroxide vulcanization system or a peroxide-sulfur mixed vulcanization system.

14. The rubber composition according to claim 1, wherein, said filler is selected from silica, carbon black, or a blend of silica and carbon black.

15. The rubber composition according to claim 1, wherein, based on 100 parts by weight of said rubber matrix, said compounding component comprises 2-80 parts of a plasticizer, 0-3 parts of a stearic acid, 0-10 parts of a metal oxide, 0-20 parts of a surface modifier, 0-8 parts of a stabilizer, 0-15 parts of a tackifier and 0-20 parts of an adhesive.

16. The rubber composition according to claim 2, wherein, said branched polyethylene is an ethylene homopolymer having a branching degree of from 50 branches/1,000 carbons to 82 branches/1,000 carbons.

17. The rubber composition according to claim 2, wherein, said branched polyethylene is an ethylene homopolymer having a branching degree of from 50 branches/1,000 carbons to 72 branches/1,000 carbons.

18. The rubber composition according to claim 2, wherein, said branched polyethylene is an ethylene homopolymer having a branching degree of from 50 branches/1,000 carbons to 60 branches/1,000 carbons.

19. The rubber composition according to claim 1, wherein, said branched polyethylene is an ethylene homopolymer having a weight average molecular weight of $6.6 \times 10^4$ to $53.4 \times 10^4$ g/mol.

20. The rubber composition according to claim 1, wherein, said branched polyethylene is an ethylene homopolymer having a weight average molecular weight of from $20 \times 10^4$ to $40 \times 10^4$ g/mol.

* * * * *